United States Patent
Park et al.

(10) Patent No.: US 10,167,772 B2
(45) Date of Patent: Jan. 1, 2019

(54) BYPASS VALVE APPARATUS (71) Applicants: Hyundai Motor Company, Seoul (KR); Kia Motors Corporation, Seoul (KR)

(72) Inventors: Jungjoo Park, Gunpo-si (KR); Choo Saeng Choi, Seongnam-si (KR); Hyo Chul Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 15/373,667

(22) Filed: Dec. 9, 2016

(65) Prior Publication Data
US 2018/0119604 A1 May 3, 2018

(30) Foreign Application Priority Data
Oct. 27, 2016 (KR) .......................... 10-2016-0141196

(51) Int. Cl.
*F16K 31/06* (2006.01)
*F02B 29/04* (2006.01)
*F04D 15/00* (2006.01)

(52) U.S. Cl.
CPC .......... *F02B 29/0418* (2013.01); *F02B 29/04* (2013.01); *F04D 15/0011* (2013.01); *F16K 31/0658* (2013.01); *Y10T 137/86558* (2015.04)

(58) Field of Classification Search
CPC .. F16K 31/0658; F04D 15/0011; F02B 29/04; F02B 29/0418; Y10T 137/86292; Y10T 137/86558
USPC .......... 251/129.15–129.22; 137/583, 625.18
See application file for complete search history.

(56) References Cited

U.S. PATENT DOCUMENTS

| 4,805,582 A | * | 2/1989 | Braun | ..................... F02M 26/58 |
| | | | | 123/568.26 |
| 5,467,962 A | * | 11/1995 | Bircann | ................. F02M 26/53 |
| | | | | 251/129.15 |
| 5,549,131 A | | 8/1996 | Maxwell et al. | |
| 5,603,228 A | * | 2/1997 | Barthold | ............... B08B 9/0327 |
| | | | | 137/240 |

(Continued)

FOREIGN PATENT DOCUMENTS

| JP | 2003-193850 A | 7/2003 |
| KR | 10-2013-0021412 A | 3/2013 |

(Continued)

*Primary Examiner* — John Bastianelli
(74) *Attorney, Agent, or Firm* — Morgan, Lewis & Bockius LLP (57) ABSTRACT

A bypass valve apparatus may include an upper body, a lower body in which the upper surface thereof is coupled with the lower surface of the upper body and the lower surface thereof is coupled to an upper end portion of the compressed air passage, a solenoid disposed in the upper body, a plunger movable in the hollow of the upper body and the hollow of the lower body depending on the electric source supplied to the solenoid, a return spring returning the plunger to the original position when the electric source of the solenoid is released, an inlet, an outlet formed at a side end portion of the lower body, and a taper groove formed in a taper shape at a portion spaced from the outlet on an internal circumference in the hollow of the lower body.

13 Claims, 8 Drawing Sheets

(56) References Cited

U.S. PATENT DOCUMENTS

| | | | | |
|---|---|---|---|---|
| 2002/0104978 A1* | 8/2002 | Bircann | ............... | F16J 15/3288 |
| | | | | 251/129.15 |
| 2010/0043899 A1* | 2/2010 | Evanno | .................... | F02C 6/08 |
| | | | | 137/637 |
| 2012/0174577 A1* | 7/2012 | Bauer | .................... | F02B 37/14 |
| | | | | 60/600 |
| 2013/0298554 A1* | 11/2013 | Sellnau | .................... | F01P 3/20 |
| | | | | 60/609 |

FOREIGN PATENT DOCUMENTS

| | | |
|---|---|---|
| KR | 10-2014-0040360 A | 4/2014 |
| KR | 10-2014-0083365 A | 7/2014 |

* cited by examiner

BYPASS VALVE APPARATUS

CROSS-REFERENCE TO RELATED APPLICATION

The present application claims priority to Korean Patent Application No. 10-2016-0141196 filed in the Korean Intellectual Property Office on Oct. 27, 2016, the entire contents of which is incorporated herein for all purposes by this reference.

BACKGROUND OF THE INVENTION

Field of the Invention

The present invention relates to a bypass valve apparatus. More particularly, the present invention relates to a bypass valve apparatus being applied to a passage of compressed air in a vehicle.

Description of the Related Art

Generally, an engine operates by energy which is generated by combustion heat when a mixed gas is combusted in a combustion chamber. In this regard, the mixed gas includes air and a fuel. An intake passage, through which the mixed gas or air to be mixed with a fuel is supplied, is connected to a cylinder of the engine. Herein, the mixed gas or the air to be mixed with the fuel is collectively called intake air of the engine.

A diesel engine includes an exhaust gas recirculation apparatus configured to recirculate exhaust gas for use as intake air of the engine so as to reduce the emission of NOx. In this regard, the exhaust gas recirculation passage configured to recirculate the exhaust gas may be connected to the intake air passage. In addition, the exhaust gas recirculation passage may include a valve for the recirculated exhaust gas to be selectively supplied to the intake air passage.

If the valve is opened, exhaust gas passing through the valve via the exhaust gas recirculation passage is supplied to a compressor of a turbocharger together with fresh air passing through an intake line via a throttle valve, and compressed air of compressing exhaust gas and fresh air by the compressor of the turbocharger is transferred to an intake manifold as intake air of an engine after being cooled by passing through an intercooler.

But, if the throttle valve is closed when compressed air compressed by the compressor of the turbocharger is remained in a passage of compressed air communicating the compressor of the turbocharger with the intercooler, compressed air remained in the compressed air passage may be backwardly flowed into the compressor of the turbocharger, thereby damaging the turbocharger. In addition, if compressed air is remained in the compressed air passage on the state that the throttle valve is closed, flow of intake air supplied to an engine by opening the throttle valve may be obstructed. Therefore, efficiency and performance of an engine may be declined, and fuel consumption may be deteriorated.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a bypass valve apparatus having advantages of removing compressed air remained in a compressed air passage when a throttle valve is closed.

In addition, the present invention has been made in an effort to provide a bypass valve apparatus having further advantages of rapidly performing to remove compressed air remained in a compressed air passage while a throttle valve is closed throttle valve.

A bypass valve apparatus according to an exemplary embodiment of the present invention may be provided to a compressed air passage for selectively bypassing compressed air being supplied to an intercooler from a turbocharger.

The bypass valve apparatus may include an upper body formed in a hollow cylindrical shape having an upper surface thereof which is closed and a lower surface which is opened, a lower body formed in a hollow cylindrical shape having an upper surface and a lower surface which are opened, and configured so that the upper surface thereof is coupled with the lower surface of the upper body and the lower surface thereof is coupled to an upper end portion of the compressed air passage, a solenoid disposed in the upper body to selectively receive the electric source, a plunger making an up and down reciprocal motion in the hollow of the upper body and the hollow of the lower body depending on the electric source supplied to the solenoid, a return spring returning the plunger to the original position when the electric source of the solenoid is released, an inlet opened or closed depending on a reciprocal motion of the plunger and formed at a lower end portion of the lower body to fluidically-communicate the hollow of the lower body with the compressed air passage, an outlet formed at a side end portion of the lower body to fluidically-communicate the hollow of the lower body with an intake line of an engine, and a taper groove formed in a taper shape at a portion spaced from the outlet on an internal circumference in the hollow of the lower body.

The inlet may be opened by raising the plunger such that compressed air of the compressed air passage is flowed into the intake line after sequentially passing the inlet, the hollow of the lower body, and the outlet in a case that a throttle valve is closed.

The taper groove may be formed at a portion formed in semicircle shape, which is spaced from the outlet on an internal circumference of the hollow of the lower body.

The taper groove may be formed in a taper shape.

The taper groove may have the taper shape having a circular cone, wherein a lower side of the circular cone faces the inlet.

The hollow of the lower body may be formed in a circular shape.

The hollow of the lower body may be formed in a shape that a semicircle to be adjacent to the outlet is spaced from an opposite semicircle and the semicircle to be adjacent to the outlet and the opposite semicircle are connected with each other.

A bypass valve apparatus according to an exemplary embodiment of the present invention capable of being provided to a compressed air passage for selectively bypassing compressed air being supplied to an intercooler from a turbocharger may include an upper body formed in a hollow cylindrical shape having an upper surface thereof which is closed and a lower surface which is opened, a lower body formed in a hollow cylindrical shape having an upper surface and a lower surface which are opened, and configured so that the upper surface thereof is coupled with the lower surface of the upper body and the lower surface thereof is coupled to an upper end portion of the compressed air passage, a solenoid disposed in the upper body to selectively receive the electric source, a plunger making an up and down reciprocal motion in the hollow of the upper body and the hollow of the lower body depending on the electric source supplied to the solenoid, a return spring returning the plunger to the original position when the electric source of the solenoid is released, an inlet opened or closed depending on a reciprocal motion of the plunger and formed at a lower end portion of the lower body to fluidically-communicate the hollow of the lower body with the compressed air passage, an outlet formed at a side end portion of the lower body to fluidically-communicate the hollow of the lower body with an intake line of an engine, and a cylinder portion, which is an internal circumference of the lower body, configured such that the hollow of the lower body is formed in a shape that a semicircle to be adjacent to the outlet is spaced from an opposite semicircle and the semicircle to be adjacent to the outlet and the opposite semicircle are connected with each other.

The bypass valve apparatus may raise the plunger to open the inlet such that compressed air of the compressed air passage is flowed into the intake line after sequentially passing the inlet, the hollow of the lower body, and the outlet in a case that a throttle valve is closed.

The bypass valve apparatus may further include a taper groove formed in a taper shape at a portion spaced from the outlet on an internal circumference in the hollow of the lower body.

The taper groove may be formed at a portion formed in semicircle shape, which is spaced from the outlet on an internal circumference of the hollow of the lower body.

The taper groove may be formed in a taper shape.

The taper groove may have the taper shape having a circular cone, wherein a lower side of the circular cone faces the inlet.

According to an exemplary embodiment of the present invention, as compressed air remained in the compressed air passage is selectively bypassed via the bypass valve apparatus, compressed air remained in the compressed air passage can be removed when the throttle valve is closed.

As a result, it may be prevented that the turbocharger damaged by compressed air being backwardly flowed from the compressed air passage to the compressor of the turbocharger.

Ultimately, as flow of intake air supplied to an engine by opening the throttle valve is to be smooth, efficiency and performance of an engine can be improved and fuel consumption can be enhanced.

Further, by the shape of the taper groove and the shape of the cylinder extended portion, flow of compressed air bypassed from the compressed air passage via the bypass valve apparatus can be rapid.

Therefore, reactivity of removing compressed air of the compressed air passage to respect with the operation of the throttle valve which repetitively opened or closed during a short time can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
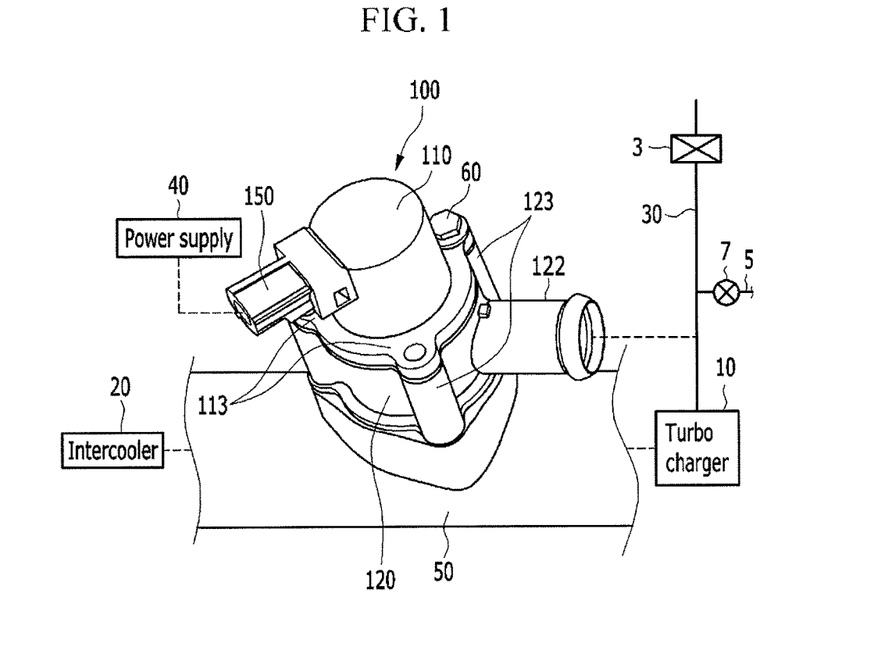
FIG. 1 is a perspective view of a bypass valve apparatus according to a first exemplary embodiment of the present invention.

FIG. 1 is a perspective view of a bypass valve apparatus according to an exemplary embodiment of the present invention.

As shown in FIG. 1, a bypass valve apparatus 100 according to an exemplary embodiment of the present invention is mounted on a compressed air passage 50 which transfers compressed air supplied from a turbocharger 10 to an intercooler 20.

The turbocharger 10 is a device which rotates a turbine by using exhaust gas exhausted from an engine and supercharges fresh air or recirculation exhaust gas by using torque of a compressor rotated by receiving torque of the turbine, and it is well known to a person of an ordinary skill in the art, so detailed description thereof will be omitted.

The intercooler 20 is a device which is configured to cool compressed air having a high temperature being generated as fresh air or recirculation exhaust gas is compressed by passing through the compressor of the turbocharger 10, and it is well known to a person of an ordinary skill in the art, so detailed description thereof will be omitted.

Herein, recirculation exhaust gas is partial exhaust gas, which is supplied to an intake line 30 of an engine intake to be used as intake air among exhaust gas passing through an exhaust line of an engine. Meanwhile, recirculation exhaust gas is selectively supplied to the intake line 30 through the exhaust gas recirculation passage 5 by opening or closing an exhaust gas recirculation valve 7 which is provided to an exhaust gas recirculation passage 5. In addition, when a throttle valve 3 is opened to inhale fresh air into the intake line 30, the exhaust gas recirculation valve 7 may be opened together with the throttle valve 3. That is, fresh air and recirculation exhaust gas are supplied to the compressor of the turbocharger 10 when the exhaust gas recirculation valve 7 and the throttle valve 3 are opened together, and only fresh air is supplied to the compressor of the turbocharger 10 when the exhaust gas recirculation valve 7 is closed and only the throttle valve 3 is opened.

The bypass valve apparatus 100 according to an exemplary embodiment of the present invention includes an upper body 110, lower body 120, and plug 150.

It may be desirable that the bypass valve apparatus 100 is mounted to the compressed air passage 50 so that the upper body 110 is disposed at an upper side thereof and the lower body 120 is disposed at a lower side thereof. For the convenience, the bypass valve apparatus 100 whereby the upper body 110 is disposed at an upper side thereof and the lower body 120 is disposed at a lower side thereof will be described, and in the following description, expressions including upper or lower mean directions to be equal to directions of arranging the upper body 110 and the lower body 120.

The upper body 110 is formed in a hollow cylindrical shape which is configured so that an upper surface is closed and a lower surface is opened.

The lower body 120 is formed in a hollow cylindrical shape which is configured so that an upper surface and a lower surface are opened. In addition, the opened upper surface of the lower body 120 is coupled with the opened lower surface of the upper body 110. Further, the opened lower surface of the lower body 120 is coupled with an upper end portion of the compressed air passage 50. In this regard, a mounting portion 52, on which the bypass valve apparatus 100 is mounted, is formed or disposed at the upper end portion of the compressed air passage 50. In addition, the bypass valve apparatus 100 is mounted to the compressed air passage 50 as the opened lower surface of the lower body 120 is coupled with the mounting portion 52.

The combination of the upper body 110, the lower body 120, and the mounting portion 52 is realized as the fastening member 60 is engaged to the mounting portion 52 on a state of penetrating the upper body 110 and the lower body 120. In addition, an engage portion 113 and 123 penetrated by the fastening member 60 is respectively formed at an external circumference of the upper body 110 and an external circumference of the lower body 120. Further, the engage portion 113 of the upper body 110 and the engage portion 123 of the lower body 120 are formed to be radially protruded in plural to be arranged at positions corresponding with each other. It is shown that three engage portions 113 and 123 are respectively formed at the upper body 110 and the lower body 120 in FIG. 1, but it is not limited thereto, so it may be designed by a person of an ordinary skill in the art to effectively couple the upper body 110, the lower body 120, and the mounting portion 52 by the minimum engage portion 113 and 123. Herein, the fastening member 60 may be a bolt, and the engage portion 113 and 123 may be formed in a nut shape.

The plug 150 is disposed at one end portion of an upper side of the upper body 110. In addition, the plug 150 is connected with the power supply portion 40 such that the bypass valve apparatus 100 receives electric power from a power supply portion 40 including a battery.

Figure 2:
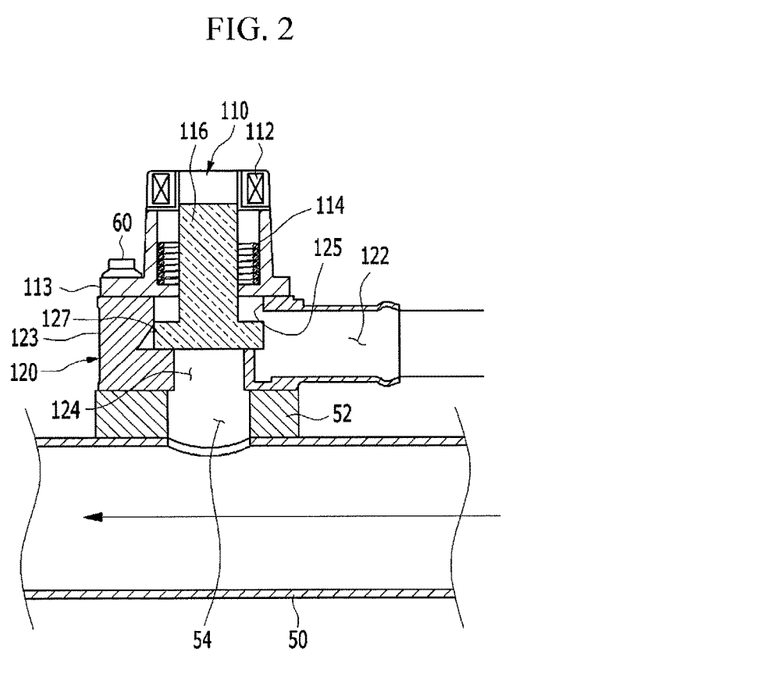
FIG. 2 is a cross-sectional view illustrating a state of not operating a bypass valve in FIG. 1.
Figure 3:
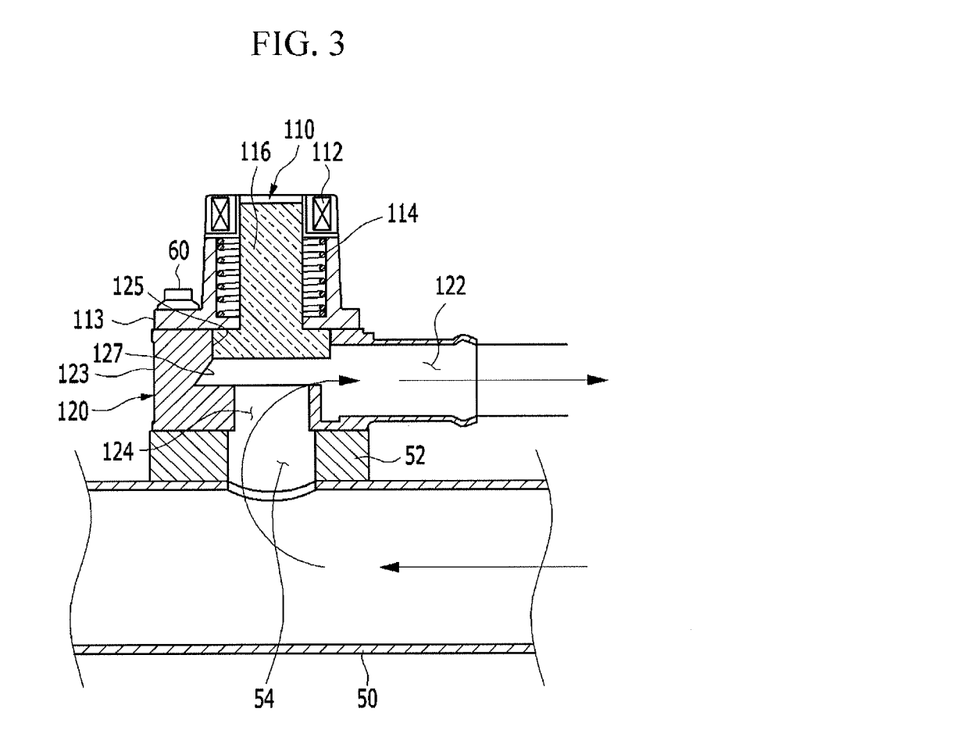
FIG. 3 is a cross-sectional view illustrating a state of operating a bypass valve apparatus in FIG. 1.

FIG. 2 is a cross-sectional view illustrating a state of not operating a bypass valve apparatus according to the first exemplary embodiment of the present invention, and FIG. 3 is a cross-sectional view illustrating a state of operating a bypass valve apparatus according to the first exemplary embodiment of the present invention.

As shown in FIG. 2 and FIG. 3, the bypass valve apparatus 100 according to an exemplary embodiment of the present invention further includes a solenoid 112, a plunger 116, a return spring 114, an inlet 124, an outlet 122, a cylinder portion 125, and a taper groove 127.

The solenoid 112 is disposed at an upper end portion of the upper body 110 to receive an electric source from the plug 150.

The plunger 116 is operated by the electric source being selectively supplied to the solenoid 112 through the plug 150. In addition, the plunger 116 is provided to make an up and down reciprocal motion in the hollow of the upper body 110 and the hollow of the lower body 120. That is, the plunger 116 is disposed from the hollow of the upper body 110 to the hollow of the lower body 120.

The return spring 114 is configured to return the plunger 116 to the original position when the electric source being transferred to the solenoid 112 through the plug 150 is released. In this regard, the return spring 114 may be disposed at the hollow of the upper body 110 to be positioned between the solenoid 112 and the plunger 116, but it is not limited thereto. That is, the plunger 116 descends by the electric source supplied to the solenoid 112 and rises to be returned to the original position by the return spring 114, or the plunger 116 rises by the electric source supplied to the solenoid 112 and descends to be returned to the original position by the return spring 114.

The inlet 124 is formed a lower end portion of the lower body 120 to fluidically-communicate the opened lower surface of the lower body 120 with the hollow of the lower body 120. In addition, the inlet 124 is closed by a lower surface of the plunger 116 when the plunger 116 descends. Further, the inlet 124 is opened when the plunger 116 rises to flow compressed air of the compressed air passage 50 into the hollow of the lower body 120. At this time, compressed air of the compressed air passage 50 is flowed into the hollow of the lower body 120 via a bypass passage 54 which is formed at the mounting portion 52 to fluidically-communicate the compressed air passage 50 with the inlet 124.

The outlet 122 is formed at a side end portion of the lower body 120 to be communicated with the hollow of the lower body 120. That is, the outlet 122 is disposed at a circumference of the lower body 120 having the cylinder shape. In addition, the outlet 122 is communicated with the inlet 124 through the hollow of the lower body 120 when the plunger 116 rises. Thus, compressed air of the compressed air passage 50 flowed in through the inlet 124 is flowed out through the outlet 122.

An internal circumference of the hollow of the lower body 120 in which the plunger 116 makes a reciprocal motion defines the cylinder portion 125.

The taper groove 127 is a groove which is formed in a taper shape in the cylinder portion 125, and is formed to face to the outlet 122.

As shown in FIG. 2, in a case that the throttle valve 3 is opened, the bypass valve apparatus 100 closes the inlet 124 by descending the plunger 116, and is operated such that compressed air supplied from the turbocharger 10 is transferred to the intercooler 20 through the compressed air passage 50.

As shown in FIG. 3, in a case that the throttle valve 3 is closed, the bypass valve apparatus 100 opens the inlet 124 by raising the plunger 116, and is operated such that compressed air supplied from the turbocharger 10 is sequentially flowed through the bypass passage 54, the inlet 124, and the outlet 122. In addition, the outlet 122 is communicated with the intake line 30 of an engine, and compressed air flowed out through the outlet 122 is bypassed to the intake line 30 (Referring FIG. 1). At this time, flow of compressed air sequentially passing through the bypass passage 54, the inlet 124, and the outlet 122 may be rapid and smooth by the shape of the taper groove 127. That is, the taper groove 127 is formed to reduce flow resistance of compressed air.

Figure 4:
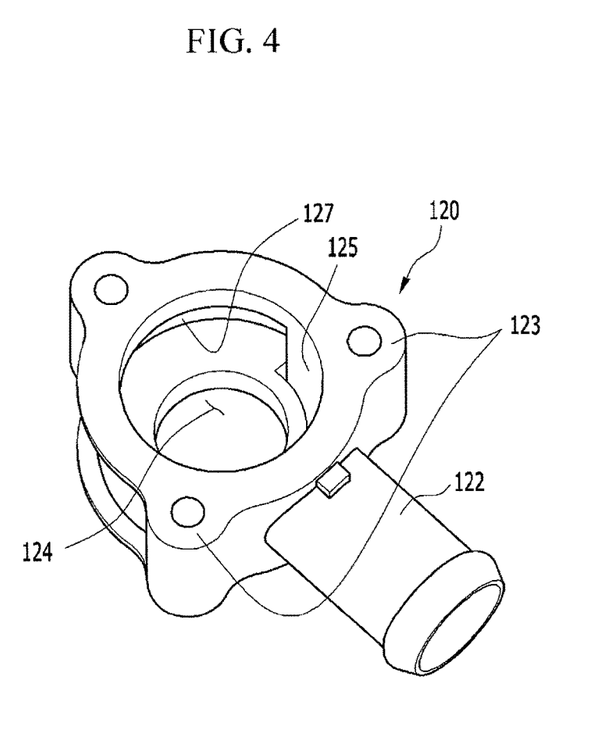
FIG. 4 is a perspective view of a lower body of the bypass valve apparatus in FIG. 1.

FIG. 4 is a perspective view of a lower body of a bypass valve apparatus according to the first exemplary embodiment of the present invention.

As shown in FIG. 4, the taper groove 127 is formed at a portion formed in semicircle shape, which is spaced from the outlet 122 on the cylinder portion 125 of the lower body 120. In addition, the taper groove 127 has the taper shape having a circular cone wherein the lower side of the circular cone faces the inlet 124.

Figure 5:
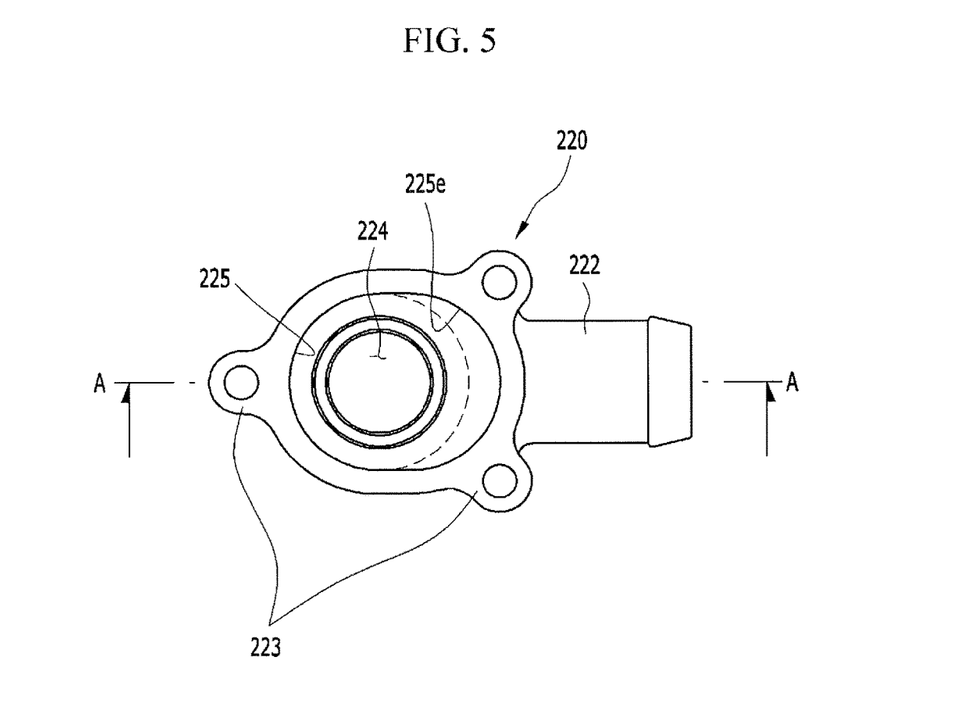
FIG. 5 is a top portion plan view of a lower body of a bypass valve apparatus according to a second exemplary embodiment of the present invention.
Figure 6:
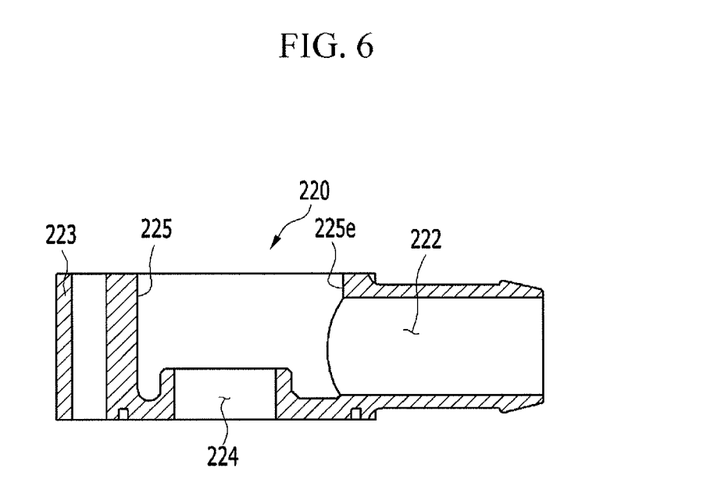
FIG. 6 is a cross-sectional view taken along a line A-A in FIG. 5.

FIG. 5 is a top portion plan view of a lower body of a bypass valve apparatus according to a second exemplary embodiment of the present invention, and FIG. 6 is a cross-sectional view taken along a line A-A in FIG. 5.

As shown in FIG. 5 and FIG. 6, a lower body 220 of a bypass valve apparatus according to the other exemplary embodiment of the present invention includes an outlet 222, an engage portion 223, an inlet 224, a cylinder portion 225, and a cylinder extended portion 225e.

According to the other exemplary embodiment of the present invention, descriptions about constituent elements are same to descriptions about the bypass valve apparatus 100 according to an exemplary embodiment of the present invention except a shape of lower body 220, so repeated descriptions will be omitted. In addition, descriptions about the outlet 222, the engage portion 223, and the inlet 224 of the lower body 220 of the bypass valve apparatus according to the other exemplary embodiment of the present invention are same to descriptions about the outlet 122, the engage portion 123, and inlet 124 of the lower body 120 of the bypass valve apparatus 100 according to an exemplary embodiment of the present invention, so repeated descriptions will be omitted.

The lower body 220 of the bypass valve apparatus according to the other exemplary embodiment of the present invention includes cylinder extended portion 225e as composition for reducing flow resistance of compressed air instead of the taper groove 127 of the bypass valve apparatus 100 according to an exemplary embodiment of the present invention.

The cylinder portion 225 of the bypass valve apparatus according to the other exemplary embodiment of the present invention is formed in a shape that a semicircle to be near the outlet 222 is extended toward the outlet 222 in comparison with the cylinder portion 125 of the bypass valve apparatus 100 according to the first exemplary embodiment of the present invention. That is, the cylinder portion 225 of the bypass valve apparatus according to the second exemplary embodiment of the present invention forms a hollow having a shape to be similar with an ellipse as the semicircle to be near the outlet 222 is offset toward the outlet 222 and then an opposite semicircle is connected with the offset semicircle. Herein, the shape of the hollow to be similar with an ellipse is a shape of a cross section that the hollow of the lower body 220 is taken by a flat surface.

In this regard, a cylinder extended portion 225e defines the semicircle extended toward the outlet 222, and flow resistance of compressed air is reduced depending on the shape of the cylinder portion 225 of the bypass valve apparatus according to the other exemplary embodiment of the present invention including the cylinder extended portion 225e.

Figure 7:
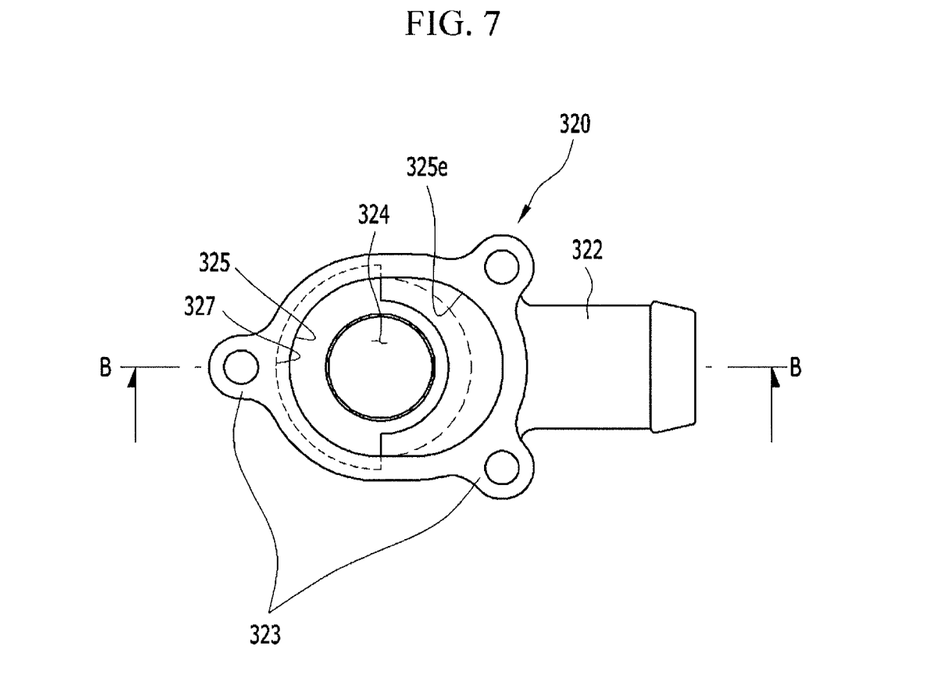
FIG. 7 is a top portion plan view of a lower body of a bypass valve apparatus according to a third exemplary embodiment of the present invention.
Figure 8:
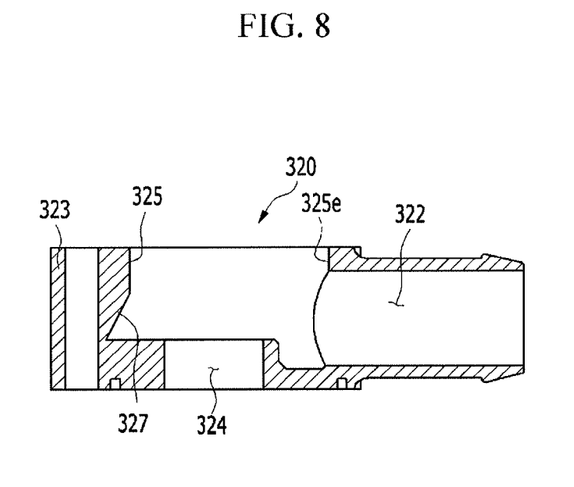
FIG. 8 is a cross-sectional view taken along a line B-B in FIG. 7.

FIG. 7 is a top portion plan view of a lower body of a bypass valve apparatus according to a third exemplary embodiment of the present invention, and FIG. 8 is a cross-sectional view taken along a line B-B in FIG. 7.

As shown in FIG. 7 and FIG. 8, a lower body 320 of a bypass valve apparatus according to another exemplary embodiment of the present invention an outlet 322, an engage portion 323, an inlet 324, a cylinder portion 325, a cylinder extended portion 325e, and taper groove 327.

According to another exemplary embodiment of the present invention, descriptions about constituent elements are same to descriptions about the bypass valve apparatus 100 according to an exemplary embodiment of the present invention except a shape of lower body 320, so repeated descriptions will be omitted. In addition, descriptions about the outlet 322, the engage portion 323, and the inlet 324 of the lower body 320 of the bypass valve apparatus according to another exemplary embodiment of the present invention are same to descriptions about the outlet 122, the engage portion 123, and inlet 124 of the lower body 120 of the bypass valve apparatus 100 according to an exemplary embodiment of the present invention, so repeated descriptions will be omitted.

The lower body 320 of the bypass valve apparatus according to another exemplary embodiment of the present invention includes all composition including the taper groove 127 of the bypass valve apparatus 100 according to an exemplary embodiment of the present invention and the cylinder extended portion 225e of the bypass valve apparatus according to other exemplary embodiment of the present invention, for reducing flow resistance of compressed air. That is, the lower body 320 of the bypass valve apparatus according to another exemplary embodiment of the present invention bypass valve apparatus further includes the taper groove 327 in comparison with the lower body 220 of the bypass valve apparatus according to the other exemplary embodiment of the present invention.

The cylinder portion 325 of the bypass valve apparatus according to another exemplary embodiment of the present invention is formed in a shape that a semicircle to be near the outlet 322 is extended toward the outlet 322 in comparison with the cylinder portion 125 of the bypass valve apparatus 100 according to an exemplary embodiment of the present invention. That is, the cylinder portion 325 of the bypass valve apparatus according to another exemplary embodiment of the present invention bypass valve apparatus is formed in a shape to be similar with an ellipse as the semicircle to be near the outlet 322 is offset toward the outlet 322 and then an opposite semicircle is connected with the offset semicircle. In this regard, a cylinder extended portion 325e defines the semicircle extended toward the outlet 322, and flow resistance of compressed air is reduced depending on the shape of the cylinder portion 225 of the bypass valve apparatus according to another exemplary embodiment of the present invention including the cylinder extended portion 325e. Further, the taper groove 327, which has been removed in the bypass valve apparatus according to the other exemplary embodiment of the present invention, is formed at the cylinder portion 325 the bypass valve apparatus according to another exemplary embodiment of the present invention. Herein, description about the taper groove 327 is same to description about the taper groove 127 of the bypass valve apparatus 100 according to an exemplary embodiment of the present invention, so repeated descriptions will be omitted.

According to an exemplary embodiment of the present invention, as compressed air remained in the compressed air passage 50 is selectively bypassed via the bypass valve apparatus 100, compressed air remained in the compressed air passage 50 can be removed when the throttle valve is closed. As a result, it may be prevented that the turbocharger 10 damaged by compressed air being backwardly flowed from the compressed air passage 50 to the compressor of the turbocharger 10. Ultimately, as flow of intake air supplied to an engine by opening the throttle valve is to be smooth, efficiency and performance of an engine can be improved and fuel consumption can be enhanced.

Further, by the shape of the taper groove 127 and 327 and the shape of the cylinder extended portion 225*e* and 325*e*, flow of compressed air bypassed from the compressed air passage 50 via the bypass valve apparatus 100 can be rapid. Therefore, reactivity of removing compressed air of the compressed air passage 50 to respect with the operation of the throttle valve which repetitively opened or closed during a short time can be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bypass valve apparatus which is provided to a compressed air passage for selectively bypassing compressed air being supplied to an intercooler from a turbocharger, comprising:
   an upper body formed in a hollow cylindrical shape having an upper surface thereof which is closed and a lower surface which is open;
   a lower body formed in a hollow cylindrical shape having an upper surface and a lower surface which are open, wherein the upper surface thereof is coupled with the lower surface of the upper body and the lower surface thereof is coupled to an upper end portion of the compressed air passage;
   a solenoid disposed in the upper body to selectively receive an electric source;
   a plunger making an up and down reciprocal motion in a hollow of the upper body and a hollow of the lower body depending on the electric source supplied to the solenoid;
   an elastic member returning the plunger to an original position thereof when the electric source of the solenoid is released;
   an inlet opened or closed depending on the reciprocal motion of the plunger and formed at a lower end portion of the lower body to fluidically-communicate the hollow of the lower body with the compressed air passage;
   an outlet formed at a side end portion of the lower body to fluidically-communicate the hollow of the lower body with an intake line of an engine; and
   a taper groove formed in a taper shape at a portion spaced from a facing the outlet on an internal circumference in the hollow of the lower body.

2. The bypass valve apparatus of claim 1, wherein the inlet is configured to be opened by raising the plunger and the compressed air of the compressed air passage flows into the intake line after sequentially passing the inlet, the hollow of the lower body, and the outlet in a case that a throttle valve is closed.

3. The bypass valve apparatus of claim 1, wherein the taper groove is formed at a portion formed in a semicircle shape, which is spaced from the outlet on an internal circumference of the hollow of the lower body.

4. The bypass valve apparatus of claim 3, wherein the taper groove is formed in a taper shape.

5. The bypass valve apparatus of claim 4, wherein the taper groove has the taper shape having a circular cone, wherein a lower side of the circular cone faces the inlet.

6. The bypass valve apparatus of claim 1, wherein the hollow of the lower body is formed in a circular shape.

7. The bypass valve apparatus of claim 1, wherein the hollow of the lower body is formed in a shape that a semicircle to be adjacent to the outlet is spaced from an opposite semicircle and the semicircle to be adjacent to the outlet and the opposite semicircle are connected with each other.

8. A bypass valve apparatus which is provided to a compressed air passage for selectively bypassing compressed air being supplied to an intercooler from a turbocharger, comprising:
   an upper body formed in a hollow cylindrical shape having an upper surface thereof which is closed and a lower surface which is open;
   a lower body formed in a hollow cylindrical shape having an upper surface and a lower surface which are open, wherein the upper surface thereof is coupled with the lower surface of the upper body and the lower surface thereof is coupled to an upper end portion of the compressed air passage;
   a solenoid disposed in the upper body to selectively receive an electric source;
   a plunger making an up and down reciprocal motion in a hollow of the upper body and a hollow of the lower body depending on the electric source supplied to the solenoid;
   an elastic member returning the plunger to an original position thereof when the electric source of the solenoid is released;
   an inlet opened or closed depending on the reciprocal motion of the plunger and formed at a lower end portion of the lower body to fluidically-communicate the hollow of the lower body with the compressed air passage;

an outlet formed at a side end portion of the lower body to fluidically-communicate the hollow of the lower body with an intake line of an engine; and a cylinder portion, which is an internal circumference of the lower body, wherein the hollow of the lower body is formed in a shape that a semicircle to be adjacent to the outlet is spaced from an opposite semicircle and the semicircle to be adjacent to the outlet and the opposite semicircle are connected with each other to form a shape similar to an ellipse.

9. The bypass valve apparatus of claim 8, wherein the inlet is configured to be opened by raising the plunger and the compressed air of the compressed air passage flows into the intake line after sequentially passing the inlet, the hollow of the lower body, and the outlet in a case that a throttle valve is closed.

10. The bypass valve apparatus of claim 8, further including a taper groove formed in a taper shape at a portion spaced from the outlet on an internal circumference in the hollow of the lower body.

11. The bypass valve apparatus of claim 10, wherein the taper groove is formed at a portion formed in a semicircle shape, which is spaced from the outlet on an internal circumference of the hollow of the lower body.

12. The bypass valve apparatus of claim 11, wherein the taper groove is formed in a taper shape.

13. The bypass valve apparatus of claim 12, wherein the taper groove has the taper shape having a circular cone, wherein a lower side of the circular cone faces the inlet.

* * * * *